Sept. 30, 1947.  J. W. ORKNEY  2,428,319
SUPPLEMENTAL SCREEN FOR HOP SEPARATORS
Filed July 10, 1945  2 Sheets-Sheet 1

Inventor
James W. Orkney
By Wilkinson & Mawhinney
Attorneys

Sept. 30, 1947.  J. W. ORKNEY  2,428,319
SUPPLEMENTAL SCREEN FOR HOP SEPARATORS
Filed July 10, 1945   2 Sheets-Sheet 2

Inventor
James W. Orkney
By Wilkinson & Mawhinney
Attorneys

Patented Sept. 30, 1947

2,428,319

UNITED STATES PATENT OFFICE 2,428,319

SUPPLEMENTAL SCREEN FOR HOP SEPARATORS

James W. Orkney, Yakima, Wash.

Application July 10, 1945, Serial No. 604,193

4 Claims. (Cl. 209—12)

1

The present invention relates to improvements in hop picking machines and more particularly relates to an improvement and adjunct to hop picking machines, of either the portable or stationary type, which has for its primary object the recapture and saving of hop blossoms and petals which are lost in the normal operation of the hop picking machine.

For convenience I have illustrated and described the improvement as being an addition to the Thys-Miller type of portable hop picking machine which is disclosed in United States Patents 2,114,727 granted April 19, 1938, 2,138,529 granted November 29, 1938, and 2,226,009 granted December 24, 1940.

Another object of the invention is to provide an attachment for existing machines which will promote the conservation and economy of materials by creating savings of petals and blossoms which are now rejected with the twigs, leaves and other lighter materials.

Another object of the invention is to accomplish this purpose by a simply constructed efficient petal catcher so constructed and arranged as to be readily added as an attachment to existing machines at small expense.

With the foregoing and other objects in view, the invention will be more fully described hereinafter, and will be more particularly pointed out in the claims appended hereto.

Figure 1:
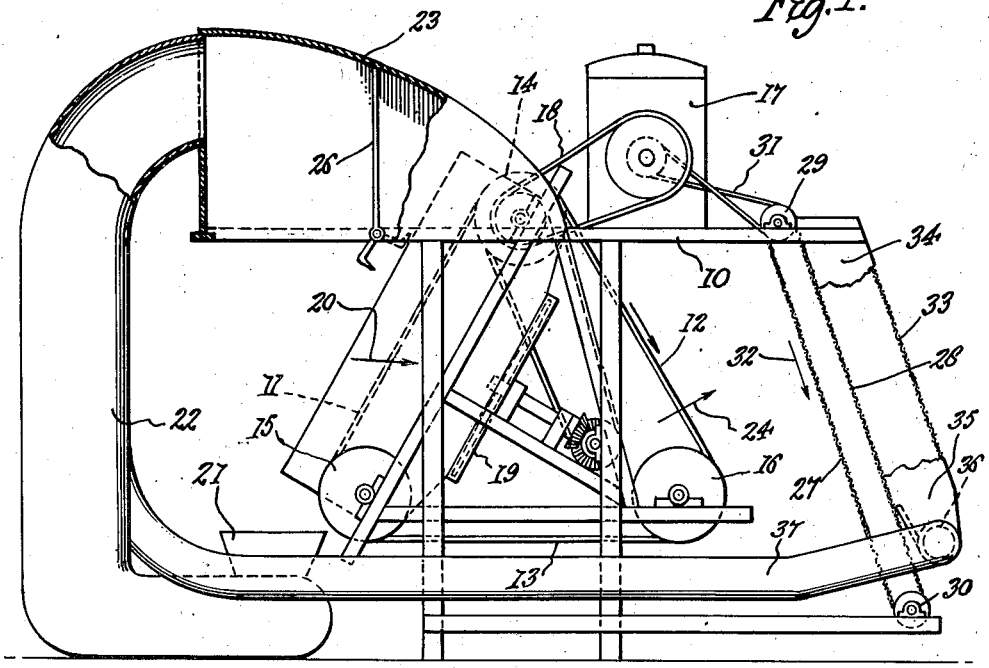
Figure 2:
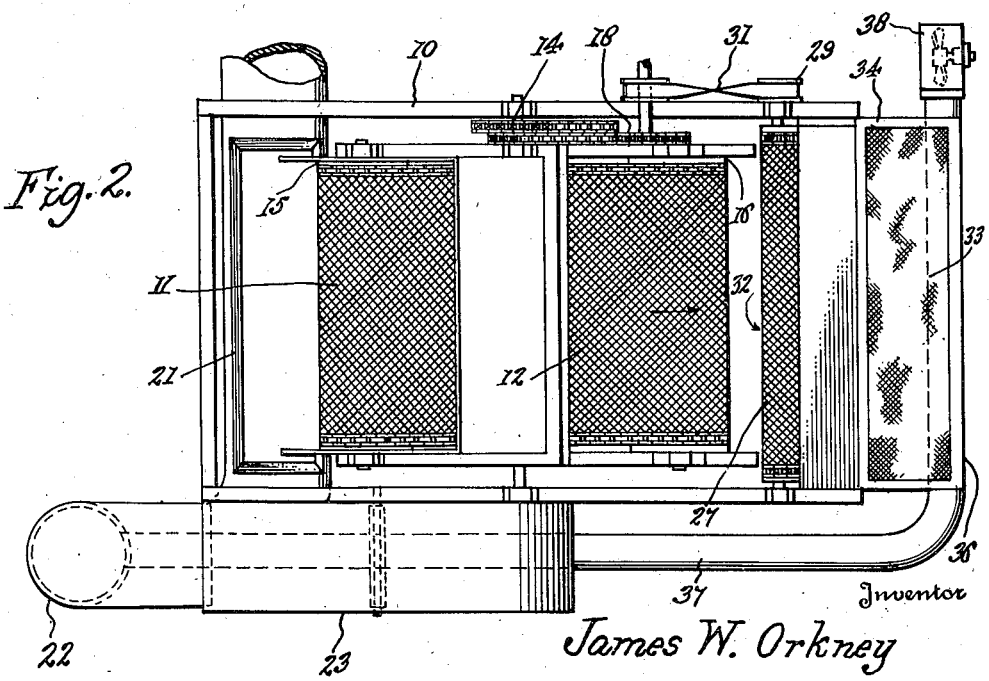
Figure 3:
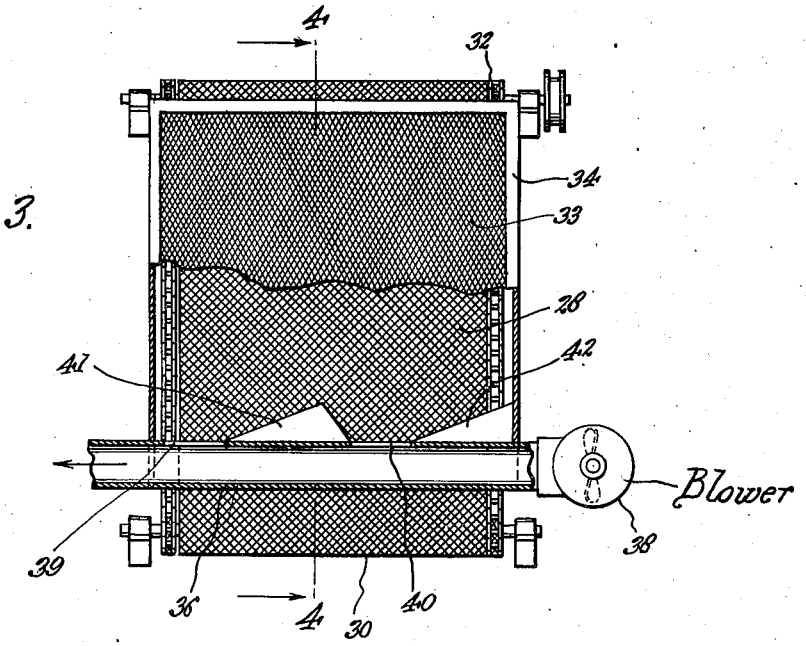
Figure 4:
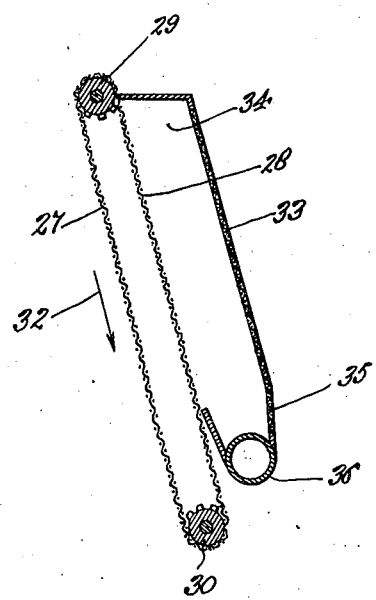

In the drawings, wherein like symbols refer to like or corresponding parts throughout the several views, Figure 1 is a side elevation, with parts broken away and parts shown in section of a Thys-Miller type of portable hop picking machine with an attachment for catching petals as constructed in accordance with the present invention, Figure 2 is a top plan view of the same, Figure 3 is a vertical longitudinal section taken through the improved attachment, and Figure 4 is a transverse vertical section taken on the line 4—4 in Figure 3.

Referring more particularly to the drawings 10 designates the frame work of a Thys-Miller type of portable hop picking machine having an endless movable screen arranged triangularly in three legs 11, 12 and 13 with its apex portion disposed upwardly and running over an upper roller 14 and with its wider base portion 13 stretched between the two horizontally spaced rollers 15 and 16. This screen is driven in a clockwise direction as indicated by the arrow. A motor 17 installed on the frame work 10 is adapted to drive the revolving screen 11, 12, 13

2 through a belt and pulley or chain and sprocket mechanism 18.

The hops together with the twigs, leaves and other unseparated matters are dropped through a hopper (not shown) upon the upper portion of the upwardly traveling screen section 11. The fan 19 creating suction in the direction of the arrow 20 holds the lighter leaves, twigs, petals, blossoms and other material against the meshes of the screen 11 while the hops which are heavier slide down the screen wall 11 and enter the conveyor hopper 21 by which they are delivered to the suction duct 22 for conveyance to the sacker 23.

The twigs, leaves, hop blossoms and petals cling to the revolving screen section 11 and are carried upwardly over the apex roller 14 and down onto the rear leg or section 12 of the screen through which the same fan 19 blows a blast of air in the direction of the arrow 24; thus blowing the twigs, leaves, petals, blossoms and other matter off the belt or screen, the same being discarded and forming simply refuse of the standard hop picking and separating machine.

Burlap bags are hung from the sacker, the hops being delivered thereinto. A shutter 26 is adapted to close off one of the sacker compartments and to open another when a hop sack is filled.

The improved attachment involves an extension of the frame 10 to receive and support an endless movable screen having the parallel runs or sections 27 and 28 running over rollers 29 and 30 suitably journaled in such frame work. This supplemental separator screen 27, 28 may be driven by a crossed belt 31 or other appropriate drive from the same motor 17 which drives the main separator screen 11, 12, 13. This supplemental screen 27, 28 rotates in the direction of the arrow 32. The run 27 is positioned in spaced relation and to the right of the section 12 of the main separating screen. In fact the run 27 of the supplemental screen preferably extends down to a much lower distance than the main screen section 12 so as to be sure to catch the petals which are blown off the main screen section 12 by the fan 19 which is utilized to also blow such petals against the supplemental screen 27.

The meshes of the supplemental screen 27, 28 will be larger than the meshes of the main screen to such an extent as to permit of the ready passage of the petals through both runs 27 and 28 of the supplemental screen under the blast of air from the fan 19, but the meshes of the supplemental screen are smaller than the leaves and sticks and the twigs. The supplemental screen run 27 will thus catch these leaves, sticks and twigs and cause the same to move down with the supplemental screen run 27 and be ultimately discharged at the bottom of the roller 30 when the same are carried out of the air current.

A screen back stop 33 is arranged to the right of the supplemental screen 27, 28. The meshes of this back stop are smaller than the petals thus preventing the passage of the petals therethrough but permitting the free passage and escape of the air whereby the petals are entrapped in an enclosure 34 of which the back stop 33 is a part. This back stop 33 instead of being reticulated may be a sheet metal suitably perforated with the perforations small enough to allow the air to escape but to arrest the petals.

The enclosure or housing 34 has a trough 35 at the lower end thereof above a tube 36 which extends lengthwise of the screen and at one end communicates with a suction duct 37 leading to the main suction duct 22. A blower fan 38 is connected with the other end of the tube 36.

As shown more particularly in Figure 3 the tube 36 has one or more openings 39, 40 in its upper portion communicating with the housing 34. Adjacent these openings 39, 40 are sloping members 41 and 42 arranged on steep angles and constituting the bottom of the catcher or housing 34 whereby to guide the petals to the openings 39, 40.

The supplemental screen could be cylindrical in shape, in which case it would revolve around the catcher 34. The screen could also revolve around four rollers with the catcher inside of the screen.

The entire purpose of the invention is to catch the petals as they are blown off the picking machine or dropped from the hop separator and at the same time separating the petals from the leaves and stems from the hop vines. The principle can be used on stationary hop picking machines as well as on portable hop picking machines. The invention is applicable to all types of hop picking machines.

In the use of the device, the petals are blown from the main screen section against and through the two runs of the supplemental screen 27, 28 and into the catcher or housing 34, the air blast escaping into the atmosphere through the back stop screen 33. The petals accumulate in the catcher 34 and will drop by gravity into the trough and will come under the influence of the suction produced in the tube 36.

This is a double suction created by the pull of the suction from the suction duct 22 and also by the blast of air from the blower fan 38. Guided by the inclined walls 41, 42 the descending petals will seek the openings 39, 40 and be drawn into the tube 36, and thence into the supplementary duct 37 and eventually into the main suction duct 22 whereby the petals will be delivered to the sacker 23.

The supplemental screen 27, 28 rejects the twigs, stems and permits passage of only the petals. The twigs, stems and other foreign matter fall to the ground. The petals are recovered and sacked with the hops.

It is obvious that various changes and modifications may be made in the details of construction and design of the above specifically described embodiment of this invention without departing from the spirit thereof, such changes and modifications being restricted only by the scope of the following claims.

What is claimed is:

1. In a hop separating machine, a movable endless main screen, a fan between sections of the screen, a sacker, a suction duct for conveying the separated hops from the screen to the sacker, a supplemental endless movable screen positioned to receive the petals and extraneous matter blown from the main screen, a catcher behind said supplemental screen for receiving the petals from the supplemental screen, and a suction duct connecting with the lower portion of said catcher and with the first mentioned suction duct to convey the collected petals to the sacker along with the hops.

2. In a hop separating machine, a movable endless main screen arranged in front and rear sections, a fan between the sections for drawing air through the front section and ejecting the air through the rear section, means to deliver hops to the front section, a suction duct having an entrance positioned below the front screen section to receive the separated hops from such section, a sacker for receiving such separated hops from the suction duct, a supplemental endless movable screen arranged and positioned to receive the petals and extraneous matter blown from the rear section of the main screen and having meshes to permit passage of such petals and to reject the extraneous matter, said supplemental screen extending below the rear section of the main screen, a catcher back of said supplemental screen for receiving the petals from the supplemental screen, and a suction duct connecting with the lower portion of said catcher and with the first mentioned suction duct to convey the collected petals to the sacker along with the hops.

3. In a hop separating machine, a movable endless main screen having a front inclined section and a rear inclined section, said sections converging upwardly and the screen movable from the front to the rear section, a blower between the sections operating to create a draft through the front section and out the back section, means for introducing hops to the upper portion of the front section, a suction duct having an entrance arranged to catch the hops after passing over the front screen, a sacker arranged to receive the hops from the suction duct, a supplemental endless movable screen also disposed on the inclination and to the rear of the main screen and separated from said rear section and having meshes to permit the passage of petals therethrough, said supplemental screen extending down to a substantially lower level than the lower end portion of the rear section of said main screen, a catcher behind said supplemental screen for receiving the petals blown through the supplemental screen by said blower, a mesh rear wall for said catcher having meshes to reject said petals, a suction duct connecting with the lower portion of said catcher and with said first mentioned suction duct to convey the collected petals to the sacker along with the hops.

4. In a hop separating machine, a movable endless main screen having front and rear inclined sections converging upwardly, said screen movable from the front to the rear section, a blower between said sections operating to draw air in through the front section and eject it backwardly through the rear section, means for feeding hops to the inclined front screen section, a suction duct having an entrance disposed below the lower end of said front screen section to receive the hops therefrom, a sacker for receiving the hops from the suction duct, a supplemental endless movable screen positioned on the inclination generally that of the rear section of the main screen but spaced rearwardly therefrom and having meshes to receive therethrough the petals blown from the main screen rear section, said supplemental screen extending down to a lower level than the rear section of the main screen, a catcher back of said supplemental screen, a rear foraminous wall for said catcher having perforations of a size to reject the petals, a second suction duct communicating with the lower portion of said catcher and extending to and communicating with the first mentioned suction duct to convey the collected petals to the sacker along with the hops.

JAMES W. ORKNEY.

REFERENCES CITED

The following references are of record in the file of this patent:

UNITED STATES PATENTS

| Number | Name | Date |
|---|---|---|
| 2,226,009 | Miller | Dec. 24, 1940 |
| 2,257,552 | Hammack | Sept. 30, 1941 |

FOREIGN PATENTS

| Number | Country | Date |
|---|---|---|
| 516,822 | Great Britain | Jan. 12, 1940 |
| 42,678 | Norway | Dec. 27, 1926 |